(12) United States Patent
Yoo et al.

(10) Patent No.: US 6,506,845 B1
(45) Date of Patent: Jan. 14, 2003

(54) METHOD OF PREPARING RUBBER SUBSTRATE

(75) Inventors: Keun-hoon Yoo, Taejeon (KR); Jae-ho Lee, Seoul (KR); Geon-soo Kim, Yocheon (KR); Chan-hong Lee, Taejeon (KR)

(73) Assignee: LG Chemical, LTD, Seoul (KR)

( * ) Notice: Subject to any disclaimer, the term of this patent is extended or adjusted under 35 U.S.C. 154(b) by 0 days.

(21) Appl. No.: 09/270,889

(22) Filed: Mar. 17, 1999

(30) Foreign Application Priority Data

Mar. 20, 1998 (KR) .............................. 98-9632

(51) Int. Cl.[7] .............................................. C08F 279/02
(52) U.S. Cl. ....................... 525/315; 525/243; 525/308; 525/310; 525/316; 525/902; 525/942; 528/486
(58) Field of Search ................................. 525/243, 315, 525/316, 902, 942, 308, 310; 528/486

(56) References Cited

U.S. PATENT DOCUMENTS 3,607,983 A * 9/1971 Rushton et al. ......... 525/316 X
3,855,355 A * 12/1974 Moore ........................ 525/316
4,046,839 A * 9/1977 Papetti .................... 525/316 X

FOREIGN PATENT DOCUMENTS

| EP | 0 265 142 | * 4/1988 | ................ 525/902 |
| JP | Showa 42-3112 | 2/1967 | |
| JP | Showa 55-19246 | 5/1980 | |
| JP | Showa 63-117005 | 5/1988 | |
| JP | Showa 63-132903 | 6/1988 | |
| JP | Heisei 2-9601 | 3/1990 | |
| JP | Heisei 7-157501 | 6/1995 | |

* cited by examiner

*Primary Examiner*—Fred Teskin
(74) *Attorney, Agent, or Firm*—Knobbe, Martens, Olson, and Bear LLP

(57) ABSTRACT

A method of preparing rubber substrate is provided. In the method, 50 to 95 parts by weight of conjugated diene monomer is first-polymerized, until the resulting first rubber substrate has gel content of 5 to 70 wt %. Thereafter, the first rubber substrate is second-polymerized with 5 to 50 parts by weight to obtain a second rubber substrate. The obtained second rubber substrate has higher gel content in core than outer layer.

22 Claims, No Drawings

METHOD OF PREPARING RUBBER SUBSTRATE

CROSS-REFERENCES TO RELATED APPLICATIONS

This application is based on application No. 98-9632 filed in the Korea Industrial Property Office on Mar. 20, 1998.

BACKGROUND OF THE INVENTION (a) Field of the Invention

The present invention relates to a method of preparing rubber substrate, and more particularly, to a method of preparing rubber substrate being capable of manufacturing rubber latex having large size and narrow distribution of the rubber particle size.

(b) Description of the Related Art

Graft polymers such as ABS (acrylonitrile-butadiene-styrene) are well known in the polymer industry, as are methods for their preparation, and are advantageous for use in various applications. Generally, the ABS graft polymers (resin) contain rubber substrates or backbone portion formed of a conjugated diene such a butadiene, and a grafted portion.

The impact resistance of the ABS resin is affected by size and distribution of the rubber substrate particles. For increasing impact resistance of the ABS resin, particle size of the rubber substrate particle for preparing the ABS resin should further increased.

In order to increase size, the rubber substrate particles are contacted with acidic materials, such as acetic acid or phosphoric acid, lowering pH of the particles and coagulating the particles. As the particles are coagulated with each other, particle size increases. In the present application, rubber substrate means rubber latex having small particle size before coagulation and rubber latex means rubber latex having large particle size after coagulation. The above methods are disclosed in Japanese Patent laid-open Nos. Sho 63-132903, Sho 63-117005, Hei 7-157501, and Japanese Patent Nos. Hei 2-9601, Sho 55-19246 and Sho 42-3112.

The size and distribution of rubber latex particles obtained by the above method are affected by the acidic material content and the gel content of rubber substrate particles. If the gel content is higher, the unwanted coagulum in the rubber latex is reduced, but particle size is smaller and particle size distribution is wide, lowering the impact resistance of rubber latex. If the gel content is smaller, the rubber latex has large particle size and a narrow particle size distribution, but an excess of coagulum occurs.

Furthermore, the gel content significantly depends on the reaction rate. Therefore, as the reaction rate elevates, the gel content increases and latex particle to be reacted is abundant. Due to these reasons, it is impossible to enlarge particle size during coagulation with the addition of acidic materials and make narrow particle size distribution.

SUMMARY OF THE INVENTION

It is object of the present invention to provide a method of preparing rubber substrates including a core and an outer layer, gel content of which are different.

It is another object of the present invention to provide a method of preparing rubber substrate having a large particle size and a narrow particle size distribution.

To accomplish these and other objects, the method of preparing rubber substrate includes the step of first-polymerizing 50 to 95 parts by weight of aliphatic conjugated diene monomer based on 100 parts by weight of total monomer, until the first-polymerized product has a gel content 5 to 70%.

Furthermore, the method includes the step of second-polymerizing the first-polymerized product with 5 to 50 parts by weight of monomer based on 100 parts by weight of total monomer.

One aspect of the present invention is to provide a method of preparing a rubber substrate. The method comprises first-polymerizing 50 to 95 parts by weight of an aliphatic conjugated diene monomer or a mixture of an aliphatic conjugated diene monomer and a copolymerizable ethylenically unsaturated monomer, thereby forming a core having a gel content; and second-polymerizing the core with 5 to 50 parts by weight of one or more monomers comprising an aliphatic conjugated diene monomer to form an outer layer on the core, thereby forming a rubber substrate comprising the core and the outer layer, wherein the parts of the monomers in the first and second polymerizing are based on 100 parts by weight of total monomers used in both of the first and second polymerizations. In the method, the rubber substrate has an average particle size of 600 to 1500 Å. The rubber substrate has gel content of 60–95 wt %. The aliphatic conjugated diene monomer is at least one monomer selected from the group consisting of 1,3-butadiene, isoprene, chloroprene and piperylene. The copolymerizable monomer is selected from the group consisting of aromatic vinyl compounds, acrylate esters, methacrylate esters and vinylcyan compounds. The rubber substrate has a swelling index of 12 to 40. The gel content of the core is higher than a gel content of the outer layer. The one or more monomers comprise a mixture of an aliphatic conjugated diene monomer and a copolymerizable ethylenically unsaturated monomer. The gel content of the core is from 5 to 70 wt. %. The copolymerizable monomer is in an amount less than 20 parts by weight.

Another aspect of the present invention is to provide a rubber substrate prepared by the above-discussed method.

Still another aspect of the present invention is to provide a method of producing a rubber latex. The method comprises: preparing a rubber substrate by the above-discussed rubber substrate preparing method, and contacting the rubber substrate with an acid. In this method, the acid comprises acetic acid.

Still another aspect of the present invention is to provide a method of producing an acrylonitrile-butadiene-styrene (ABS) resin. The method comprises preparing a rubber latex using the above-discussed rubber latex producing method; and grafting styrene and acrylonitrile on the rubber latex, thereby producing an ABS resin. In the method, the grafting comprises reacting the rubber latex with a mixture comprising styrene and acrylonitrile.

Still anther aspect of the present invention is to provide an acrylonitrile-butadiene-styrene (ABS) resin produced by the above-discussed method of producing an ABS resin.

A still further aspect of the present invention is to provide a rubber substrate for use in producing an acrylonitrile-butadiene-styrene (ABS) resin. The rubber substrate comprises a rubber core and a rubber outer layer, each of which has a gel content, wherein the rubber core and outer layer are polymers of one or more monomers comprising aliphatic conjugated diene monomer, and wherein the gel content of the core is higher than a gel content of the outer layer. In the rubber substrate, the aliphatic conjugated diene monomer is at least one monomer selected from the group consisting of 1,3-butadiene, isoprene, chloroprene and piperylene. The one or more monomers comprise a mixture of an aliphatic conjugated diene monomer and a copolymerizable ethylenically unsaturated monomer. The copolymerizable monomer is selected from the group consisting of aromatic vinyl compounds, acrylate esters, methacrylate esters and vinylcyan compounds. The rubber substrate has an average particle size of 600 to 1500 Å. The rubber substrate has gel content of 60–95 wt %. The rubber substrate has a swelling index of 12 to 40. The gel content of the core is from 5 to 70 wt. %.

DETAILED DESCRIPTION OF THE INVENTION

The rubber substrate obtained by the method of the present invention has a core and an outer layer formed on the core. The gel content of the core is higher than that of the outer layer. Using the rubber substrate, a large particle size and a narrow particle size distribution rubber latex may be obtained. Furthermore, when ABS resin is prepared by using the rubber latex obtained, ABS resin having excellent impact resistance can be obtained.

The rubber substrate preparation method will be now described in more details.

50 to 95 parts by weight of monomer based on 100 parts by weight of total monomer is first-emulsion polymerized. The emulsion polymerization methods are well known in the art and generally include a detergent (a surfactant), an initiator and a molecular weight regulating agent in the emulsion polymerization medium.

The monomer may be only aliphatic conjugated diene monomer or a mixture of conjugated diene monomer and copolymerizable ethylenically unsaturated monomer. The conjugated diene monomer may be 1,3-butadiene, isoprene, chloroprene, piperylene, and comonomer thereof. The copolymerizable monomer may be aliphatic vinyl compounds such as styrene, $\alpha$-methylstyrene and vinylcyan compound such acrylonitrile. The copolymerizable monomer in the mixture monomer is less than 20 parts by weight.

The detergent may be alkyl aryl sulfonate, alkali metal sulfate, sulfonated alkylester, fatty acid soap, alkali salt of rosin acid such as potassium rosinate, alkai salt of olenoic acid such as potassium oleate and a mixture thereof. The detergent may present in the amount of 1 to 4 parts by weight.

The initiator may be water-soluble persulfate or peroxy compounds and water-solube redox systems. The persulfate may be sodium and potassium persulfate. The oil-soluble initiator may be cumene hydroperoxide, diisopropyl benzene hydroperoxide, azobisisobutyronitrile, tertiary butyl hydroperoxide, paramethanehydroperoxide, benzoyl peroxide and a mixture thereof. Besides, a mixture of water-soluble and fat-soluble radical initiators may be used. The amount of initiator may be 0.1 to 0.6 parts by weight.

The emulsion polymerization medium may be KCl, NaCl, $KHCO_3$, $NaHCO_3$, $K_2CO_3$, $Na_2CO_3$, $KHSO_3$, $NaHSO_3$, $K_4P_2O_7$, $Na_4P_2O_7$, $K_3PO_4$, $Na_3PO_4$, $K_2HPO_4$, $Na_2HPO_4$ and a mixture thereof. The amount of medium may be 0.2 to 1.0 parts by weight.

The molecular weight regulating agent may be n-octyl mercaptan, cyclohexyl mercaptan, dipentene dimercaptan, n-butyl mercaptan, n-dodecyl mercaptan, tertiary dodecyl mercaptan. The molecular weight regulating agent may present in the amount of 0.1 to 0.5 parts by weight.

The first-emulsion polymerization is carried out for about 5 to 15 hours at 50 to 70° C. After the first-emulsion polymerization, the core of rubber substrate has a gel content of 5 to 70 wt %.

Thereafter, the core of the rubber substrate reacts with 5 to 40 parts by weight of monomer and 0.05 to 1.2 parts by weight of a molecular weight regulating agent to produce an outer layer on the core of the rubber substrate.

The gel content of the core is higher than that of the outer layer. The average particle size of the rubber substrate is 700 to 1500 Å and a distribution of particle size is less than 25%. Furthermore, the gel content of the rubber substrate is 70 to 99% and the swelling index of the gel is 16 to 40.

When such rubber substrate is used for preparing rubber latex, a rubber latex having a large particle size and a narrow particle size distribution can be prepared. As the rubber latex preparation method, the conventional method including the step of contacting the rubber substrate with acidic materials such as acetic acid may be used. As the rubber latex has a large particle size and a narrow particle distribution, ABS resin having excellent impact resistance can be prepared by using the rubber latex.

The present invention is further explained in more details with reference to the following examples. The invention can be utilized in various ways and is not intended to be confined to those examples.

Rubber Substrate Preparation

Example 1a

1) First-polymerization 110 parts by weight of deionized water, 85 parts by weight of 1,3-butadiene, 1.2 parts by weight of potassium rosinate, 1.5 parts by weight of potassium oleate, 0.1 parts by weight of $Na_2CO_3$, 0.5 parts by weight of $KHCO_3$, 0.3 parts by weight of tertiary dodecyl mercaptane and 0.3 parts by weight of potassium persulfate were added at one time to a polymerization reactor charged with nitrogen (autoclave) and polymerized, obtaining a core of rubber substrate. The reaction was carried out for 10 hours at 55° C.

2) Second Polymerization 15 parts by weight of 1,3-butadiene and 0.05 tertiary dodecyl mercaptane were added at one time to the reactor and reacted with the core of the rubber substrate for 8 hours at 65° C.

Examples 2a to 4a and Comparative Examples 1a to 2a

Rubber substrates were prepared by the same procedure in Example 1a except that the amounts of the compositions, addition method and first-polymerization period were changed as the following Table 1.

The conversion, gel content, swelling index, particle size and the produced coagulum of the rubber substrates of examples 1a to 4a and comparative examples 1a to 2a were determined as the following test method. The results are shown in Table 1. In the Table 1, "EX" refers to example and "COM" refers to comparative example.

1) Gel Content and Swelling Index

Rubber substrate of example 1a was coagulated with diluted acid, washed and dried in an oven at 60° C. for 24 hours under the vacuum. The dried rubber substrate was thinly cut with scissors. 1 g of the thin rubber substrate was added to 100 g of toluene and allowed to stand for 48 hours at room temperature in a dark room. After 48 hours, the thin rubber substrate was separated to sol and gel. The same test was performed by using rubber substrates of examples 2a to 4a and comparative examples 1a to 2a.

The gel content and Swelling index were calculated using the following equations 1 and 2.

$$\text{Gel content (\%)} = \{\text{weight of the unsolved material (gel)/weight of sample}\} * 100 \quad \text{Equation 1}$$

$$\text{Swelling index} = \text{weight of the swelled gel/weight of total gel} \quad \text{Equation 2}$$

2) Particle Size and Distribution Thereof

Particle size and distribution thereof were determined with Nicomp 370 HPL by the dynamic laser light scattering method.

3) Coagulated Material Percentage

The coagulated material percentage was calculated by the equation 3.

$$\text{Coagulated material percentage} = \{\text{weight of coagulated material produced in the reactor/weight of the added total monomer}\} * 100 \quad \text{Equation 3}$$

4) Graft Polymer Percentage

The graft polymer percentage was calculated by the equation 4.

$$\text{Graft polymer percentage} = \{\text{weight of the grafted monomer/weight of rubber substrate}\} * 100 \quad \text{Equation 4}$$

Examples 2b and 4b, and Comparative Examples 1b and 2b

Rubber latex were prepared by the same procedure in preparation example 1b except that rubber substrates obtained by the Examples 2a and 4a, and comparative examples 1a and 2a were used.

The particle size, particle size distribution and pH of latex of the rubber latices obtained by examples 1b, 2b and 4b, and comparative examples 1b and 2b. The results are shown in Table 2.

TABLE 2

|  | EX 1b | EX 2b | EX 4b | COM 1b | COM 2b |
|---|---|---|---|---|---|
| Particle size | 3300 Å | 3200 Å | 3350 Å | 2900 Å | 2800 Å |
| Distribution of particle size | 10% | 8% | 20% | 35% | 30% |
| pH of latex | 10.5 | 10.6 | 10.4 | 10.5 | 10.5 |

As shown in Table 2, particle size of examples 1b, 2b and 4b is larger than that of comparative examples 1b and 2b. Furthermore, distribution of examples 1b, 2b and 4b is more narrow than that of comparative examples 1b and 2b.

TABLE 1

|  | EX 1a | EX 2a | EX 3a | EX 4a | COM 1a | COM 2a |
|---|---|---|---|---|---|---|
| Deionized water | 110 | 115 | 100 | 110 | 115 | 112 |
| 1,3-butadiene | 85 | 70 | 55 | 90 | 100 | 45 |
| Potassium rosinate | 1.2 | 1.3 | 1 | 1.1 | 1.3 | 1.1 |
| Potassium oleate | 1.5 | 1.4 | 1.6 | 1.6 | 1.4 | 1.6 |
| Sodium carbonate | 0.1 | 0.1 | 0.1 | 0.1 | 0.1 | 0.1 |
| Potassium hydrocarbnate | 0.5 | 0.5 | 0.5 | 0.5 | 0.5 | 0.5 |
| Tertiary dodecyl mercaptane | 0.3 | 0.3 | 0.3 | 0.3 | 0.3 | 0.3 |
| Potassium persulfate | 0.3 | 0.3 | 0.3 | 0.3 | 0.3 | 0.3 |
| Gel content before second polymerization | 50% | 10% | 10% | 30% | — | 2.00% |
| Addition method | At one time | At one time | At one time | Continuously | — | At one time |
| First-polymerization period | 11 hours | 7 hours | 9 hours | 10 hours | — | 6 hours |
| 1,3-butadiene | 15 | 30 | 45 | 10 | — | 55 |
| Tertiary dodecyl mercaptan | 0.05 | 0.05 | 0.05 | 0.05 | — | 0.05 |
| Polymer Conversion of monomer | 92% | 90% | 90% | 90% | 90% | 90% |
| Gel content | 90% | 75% | 83% | 85% | 88% | 65% |
| Swelling index | 18 | 24 | 21 | 20 | 19 | 26 |
| Particle size | 900 Å | 1000 Å | 800 Å | 850 Å | 900 Å | 1300 Å |
| The amount of the unwanted Coagulum | Less than 0.15% | Less than 0.10% | Less than 0.10% | Less than 0.10% | 0.50% | 0.50% |

As shown in Table 1, the amount of the unwanted coagulum produced is smaller than that of comparative examples.

Rubber Latex Preparation

Example 1b 100 parts by weight of the rubber substrate of Example 1a was charged into a reactor. The shaking speed and temperature were controlled by 30 rpm and 30° C., respectively. 3.5 parts by weight of aqueous 7% acetic acid solution was slowly added to the reactor for 1 hour. Thereafter, the shaking step was stopped and the resulting product was allowed to stand for 30 minutes to prepare rubber latex.

ABS Resin Preparation

Example 1c 50 parts by weight of the rubber latex obtained by Example 1b, 65 parts by weight of deionized water, 0.1 parts by weight of sodiumethylenediaminetetraacetate, 0.005 parts by weight of ferrous sulfate, 0.23 parts by weight of formaldehydesodiumsulfoxylate and 0.35 parts by weight of potassium rosinate were added to a reactor at one time. The temperature of the reactor was elevated to 70° C. Thereafter, a mixed emulsion solution was continuously added to the reactor for 3 hours and the temperature was elevated to 80° C. The mixed emulsion solution was prepared by mixing 50 parts by weight of deionized water, 0.65 parts by weight of potassium rosinate, 35 parts by weight of styrene, 15 parts by weight of acrylonitrile, 0.4 parts by weight of tertiary dodecyl mercaptane and 0.4 parts by weight of diisopropylenebenzenehydroperoxide.

The mixture was allowed to stand for 1 hour and the reaction was terminated. The resulting polymer has a conversion from monomer to polymer 98% and graft polymer percentage of 30% and coagulum of 0.3%.

Example 2c, and Comparative Example 1c and 2c

ABS resins were prepared by the same procedure in Example 1b except that rubber latices obtained by Example 2b and Comparative examples 1b and 2b were used.

The ABS resins obtained by examples 1c and 2c, and comparative example 1c and 2c were coagulated with aqueous solution of sulfuric acid to obtain powder, respectively. 36 parts by weight of powder and 64 parts by weight of SAN (manufactured and sold by LG chemicals, Co., Ltd., trade name of 80HF) were added a mixer and mixed. The mixture was pelleted with a extruder and injection molded. The impact strength and flexural strength of resulting products were determined and the results are shown in Table 3.

TABLE 3

|  | EX 1c | EX 2c | COM 1c | COM 2c |
|---|---|---|---|---|
| Notch Izod impact strength (23° C.) | 42 | 40 | 36 | 35 |
| (ASTM D256, kg –cm/cm) (–20 ° C.) | 22 | 21 | 16 | 15 |
| Flexural strength (ASTM D1238, g/10 min, 10 kg, 220° C.) | 16 | 16 | 15 | 15 |

As shown in Table 3, ABS resin prepared by using example 1b and 2b have excellent impact resistance.

What is claimed is:

1. A method of preparing a rubber substrate, comprising:
   first-polymerizing 50 to 95 parts by weight of either an aliphatic conjugated diene monomer or a mixture of an aliphatic conjugated diene monomer and a copolymerizable ethylenically unsaturated monomer, thereby forming a core having a gel content of 5 to 70 wt %;
   and second-polymerizing the core with 5 to 50 parts by weight of one or more monomers comprising an aliphatic conjugated diene monomer to form an outer layer on the core, thereby forming a rubber substrate comprising the core and the outer layer, wherein the parts of the monomers in the first and second polymerizations are based on 100 parts by weight of total monomers used in both of the first and second polymerizations.

2. The method of claim 1, wherein the rubber substrate has an average particle size of 600 to 1500 Å.

3. The method of claim 1, wherein the rubber substrate has gel content of 60–95 wt %.

4. The method of claim 1, wherein the aliphatic conjugated diene monomer is at least one monomer selected from the group consisting of 1,3-butadiene, isoprene, chloroprene and piperylene.

5. The method of claim 1, wherein the copolymerizable monomer is selected from the group consisting of aromatic vinyl compounds, acrylate esters, methacrylate esters and vinylcyan compounds.

6. The method of claim 1, wherein the rubber substrate has a swelling index of 12 to 40.

7. The method of claim 1, wherein the gel content of the core is higher than a gel content of the outer layer.

8. The method of claim 1, wherein one or more monomers comprise a mixture of an aliphatic conjugated diene monomer and a copolymerizable ethylenically unsaturated monomer.

9. A method of producing a rubber latex, comprising:
   preparing a rubber substrate by the method of claim 1; and
   contacting the rubber substrate with an acid.

10. The method of claim 9, wherein the acid comprises acetic acid.

11. A method of producing an acrylonitrile-aliphatic conjugated diene-styrene resin, the method comprising:
    producing a rubber latex by the method of claim 9; and
    grafting a mixture comprising styrene and acrylonitrile on the rubber latex, thereby producing an acrylonitrile-aliphatic conjugated diene-styrene resin.

12. The method of claim 11, wherein the aliphatic conjugated diene monomer comprises 1,3-butadiene and wherein the acrylonitrile-aliphatic conjugated diene-styrene resin comprises an acrylonitrile-butadiene-styrene resin.

13. The method of claim 1, wherein the copolymerizable ethylenically unsaturated monomer is in an amount less than 20 parts by weight.

14. The method of claim 12, wherein the step of grafting is conducted after the step of contacting the rubber substrate with an acid.

15. The method of claim 14, wherein the rubber substrate has an average particle size of 600 to 1500 Å, wherein the rubber substrate has a gel content of 60–95 wt %, wherein the aliphatic conjugated diene monomer is at least one monomer selected from the group consisting of 1,3-butadiene, isoprene, chloroprene and piperylene, wherein the copolymerizable monomer is selected from the group consisting of aromatic vinyl compounds, acrylate esters, methacrylate esters, and vinylcyan compounds, wherein the rubber substrate has a swelling index to 12 to 40, wherein a gel content of the core is higher than a gel content of the outer layer, wherein the one or more monomers comprise a mixture of an aliphatic conjugated diene monomer and a copolymerizable ethylenically unsaturated monomer, and wherein an amount of the copolymerizable ethylenically unsaturated monomer is the mixture is present in an amount less than 20 parts by weight.

16. The method of claim 9, wherein the aliphatic conjugated diene monomer is at least one monomer selected from the group consisting of 1,3-butadiene, isoprene, chloroprene and piperylene.

17. The method of claim 9, wherein the, one or more monomers comprises a mixture of an aliphatic conjugated diene monomer and a copolymerizable ethylenically unsaturated monomer.

18. The method of claim 17, wherein the copolymerizable ethylenically unsaturated monomer is selected from the group consisting of aromatic vinyl compounds, acrylate esters, methacrylate esters, and vinylcyan compounds.

19. The method of claim 9, wherein the rubber substrate has an average particle size of 600 to 1500 Å.

20. The method of claim 9, wherein the rubber substrate has gel content of 60–95 wt %.

21. The method of claim 9, wherein the rubber substrate has a swelling index of 12 to 40.

22. The method of claim 9, wherein the copolymerizable monomer is in an amount less than 20 parts by weight.

* * * * *